US008720958B2

(12) United States Patent
Flannery et al.

(10) Patent No.: US 8,720,958 B2
(45) Date of Patent: *May 13, 2014

(54) BARRIER WITH PANELS SLIDING PARALLEL

(75) Inventors: Mark A. Flannery, Longboat Key, FL (US); Porter R. Million, Chaska, MN (US)

(73) Assignee: Carlson Pet Products, Inc., Longboat Key, FL (US)

( * ) Notice: Subject to any disclaimer, the term of this patent is extended or adjusted under 35 U.S.C. 154(b) by 41 days.

This patent is subject to a terminal disclaimer.

(21) Appl. No.: 13/290,045

(22) Filed: Nov. 4, 2011

(65) Prior Publication Data

US 2012/0235101 A1 Sep. 20, 2012

Related U.S. Application Data

(63) Continuation-in-part of application No. 13/149,721, filed on May 31, 2011.

(60) Provisional application No. 61/453,123, filed on Mar. 15, 2011.

(51) Int. Cl.
*E05C 19/18* (2006.01)
*E05C 19/00* (2006.01)

(52) U.S. Cl.
USPC ....... 292/288; 292/80; 292/256; 292/DIG. 46

(58) Field of Classification Search
USPC ........... 292/1, 12, 15, 23, 24, 80, 81, 87, 256, 292/256.75, 258, 288–290, 292, 295–298, 292/DIG. 46; 70/14, 19, 20, 95–100; 49/449–451; 248/229.1, 248/229.11–229.17, 229.2, 229.21–229.26
See application file for complete search history.

(56) References Cited

U.S. PATENT DOCUMENTS

| 266,246 | A | | 10/1882 | Willer | |
|---|---|---|---|---|---|
| 562,095 | A | * | 6/1896 | Phillips | ........................ 160/226 |
| 712,971 | A | | 11/1902 | Sanders | |
| 1,008,146 | A | | 11/1911 | Herriman | |
| 1,196,443 | A | | 8/1916 | Ellis | |
| 1,196,447 | A | | 8/1916 | Ellis | |

(Continued)

FOREIGN PATENT DOCUMENTS

| GB | 722976 | 2/1955 |
|---|---|---|
| GB | 907632 | 10/1962 |
| JP | 1087937 | 10/2000 |
| JP | 1169549 | 4/2003 |

OTHER PUBLICATIONS

Bauer Vehicle Gear, Doggon' II Pet Barrier, 2003/2004 catalog, p. 14, Bauer Vehicle Gear, Sacramento, CA, U.S.A.

*Primary Examiner* — Carlos Lugo

(57) ABSTRACT

A barrier employed to keep children and/or pets in or out of certain areas in the house. The barrier includes four panels. Two main panels slide parallel to each other to lengthen or shorten the barrier as a whole. Two side panels stabilize the main panels and extend to the front and rear faces of the main panels to provide a self-supporting in-house barrier. Each of the panels includes a wooden frame. The wood lends less weight, less sharp edges, and more pleasing aesthetics than, for example, a metal gate. Legs are connected to the side panels to further stabilize the side panels and main panels.

19 Claims, 7 Drawing Sheets

(56) References Cited

U.S. PATENT DOCUMENTS

| | | | |
|---|---|---|---|
| 1,341,188 A | 5/1920 | Manyak et al. | |
| 1,411,824 A * | 4/1922 | Wepplo | 292/258 |
| 1,537,712 A | 5/1925 | Specht | |
| 1,542,151 A | 6/1925 | Lehtonen | |
| 1,547,048 A | 7/1925 | Klein | |
| 1,726,966 A * | 9/1929 | Schlayer et al. | 220/326 |
| 2,222,008 A * | 11/1940 | White | 292/87 |
| 2,378,683 A * | 6/1945 | Buchanan | 292/87 |
| 2,520,997 A | 9/1950 | Cavanagh | |
| 2,577,034 A | 12/1951 | Quinlan | |
| 2,610,763 A * | 9/1952 | Mendelson | 292/63 |
| 2,610,830 A | 9/1952 | Beatty | |
| 2,629,619 A * | 2/1953 | May | 292/281 |
| 2,851,746 A | 9/1958 | McPhaden | |
| 2,896,277 A | 7/1959 | Halligan | |
| 2,918,318 A * | 12/1959 | Sacharski | 292/87 |
| 2,982,353 A | 5/1961 | Luger | |
| 2,998,063 A | 8/1961 | Hafner | |
| 3,124,949 A * | 3/1964 | Friedman | 70/14 |
| 3,132,400 A * | 5/1964 | McDonald | 24/573.09 |
| 3,163,205 A | 12/1964 | Gottlieb | |
| 3,431,004 A * | 3/1969 | Schell | 292/258 |
| 3,431,966 A | 3/1969 | Injeski | |
| 3,437,365 A * | 4/1969 | Zadanoff et al. | 292/202 |
| 3,489,201 A | 1/1970 | Duncan et al. | |
| 3,490,805 A * | 1/1970 | Mastrovito et al. | 292/258 |
| 3,651,853 A | 3/1972 | Pedley | |
| 4,127,156 A | 11/1978 | Brandt | |
| 4,170,885 A * | 10/1979 | Lundgren | 70/97 |
| 4,270,668 A * | 6/1981 | Berfield | 220/324 |
| 4,486,979 A * | 12/1984 | Reitemeyer | 49/347 |
| 4,502,167 A * | 3/1985 | Porzelius | 4/253 |
| 4,574,863 A | 3/1986 | Coleman et al. | |
| 4,583,715 A | 4/1986 | Wright | |
| 4,607,455 A | 8/1986 | Bluem et al. | |
| 4,677,791 A | 7/1987 | Larson et al. | |
| 4,688,619 A | 8/1987 | Kessler et al. | |
| 4,777,765 A | 10/1988 | Johnson, Jr. | |
| 4,884,614 A | 12/1989 | Spurling | |
| 4,944,117 A | 7/1990 | Gebhard et al. | |
| 5,060,421 A | 10/1991 | Castelli | |
| 5,081,723 A | 1/1992 | Saunders | |
| 5,117,585 A | 6/1992 | Andrisin, III | |
| 5,165,148 A | 11/1992 | Fleischer et al. | |
| 5,203,596 A * | 4/1993 | Stevens | 292/204 |
| 5,272,840 A | 12/1993 | Knoedler et al. | |
| 5,367,829 A | 11/1994 | Crossley et al. | |
| 5,396,732 A | 3/1995 | Andersen | |
| 5,402,988 A | 4/1995 | Eisele | |
| 5,442,881 A | 8/1995 | Asbach et al. | |
| 5,462,318 A | 10/1995 | Cooke | |
| 5,469,807 A | 11/1995 | Kosmaczeska | |
| 5,528,859 A | 6/1996 | Taylor et al. | |
| 5,535,552 A | 7/1996 | Stern | |
| 5,570,500 A * | 11/1996 | Merkel | 24/495 |
| 5,570,543 A | 11/1996 | Bishop | |
| 5,622,347 A * | 4/1997 | Nourry | 248/316.5 |
| 5,664,371 A | 9/1997 | Berliner | |
| 5,701,991 A * | 12/1997 | Helmetsie | 198/836.1 |
| 5,716,035 A * | 2/1998 | Nourry et al. | 248/316.5 |
| 5,769,292 A * | 6/1998 | Cucheran et al. | 224/324 |
| 5,782,039 A | 7/1998 | Scherer et al. | |
| 5,865,484 A * | 2/1999 | Johns | 292/288 |
| 5,878,695 A | 3/1999 | Gent | |
| 5,906,068 A | 5/1999 | Bode | |
| 5,906,069 A | 5/1999 | Berliner | |
| 5,993,103 A | 11/1999 | Christensen | |
| 6,016,629 A | 1/2000 | Sylvester et al. | |
| 6,056,038 A | 5/2000 | Foster et al. | |
| 6,058,655 A | 5/2000 | Gravel | |
| 6,059,242 A * | 5/2000 | Lefevre et al. | 248/292.13 |
| 6,112,460 A | 9/2000 | Wagnitz | |
| 6,112,461 A | 9/2000 | Cheng | |
| 6,123,321 A | 9/2000 | Miller | |
| 6,141,912 A | 11/2000 | Graham et al. | |
| 6,161,334 A | 12/2000 | Goodin | |
| 6,176,042 B1 | 1/2001 | Rossman et al. | |
| 6,233,874 B1 | 5/2001 | Johnson, Jr. | |
| 6,367,852 B1 * | 4/2002 | Aspenwall | 292/285 |
| 6,449,901 B1 | 9/2002 | Gibree et al. | |
| 6,474,265 B1 | 11/2002 | Powell | |
| 6,477,984 B1 | 11/2002 | Kleinsasser | |
| 6,497,075 B1 | 12/2002 | Schreiner et al. | |
| 6,681,523 B1 | 1/2004 | Stener | |
| 6,711,857 B1 | 3/2004 | Wagnitz et al. | |
| 7,036,798 B1 | 5/2006 | Olson | |
| 7,131,235 B2 | 11/2006 | Hicks | |
| 7,152,372 B2 | 12/2006 | Cheng | |
| D579,609 S | 10/2008 | Hirokawa et al. | |
| 7,568,449 B2 | 8/2009 | Hirokawa et al. | |
| 7,716,874 B2 | 5/2010 | Ventrola | |
| 7,739,983 B2 | 6/2010 | Hirokawa et al. | |
| 7,775,002 B2 | 8/2010 | Puchniak | |
| 7,775,253 B1 * | 8/2010 | Milligan | 160/117 |
| 7,789,585 B2 | 9/2010 | Christensen et al. | |
| 7,950,184 B2 | 5/2011 | Flannery | |
| 7,954,456 B2 | 6/2011 | Hirokawa et al. | |
| 8,141,517 B2 | 3/2012 | Shimoda | |
| 8,230,816 B2 | 7/2012 | Hirokawa et al. | |
| 8,261,490 B2 | 9/2012 | Flannery | |
| 8,297,336 B2 | 10/2012 | Yates | |
| 2002/0153733 A1 | 10/2002 | Fuchs | |
| 2003/0197164 A1 | 10/2003 | Monahan et al. | |
| 2006/0107901 A1 | 5/2006 | Hirokawa et al. | |
| 2006/0260195 A1 | 11/2006 | Witman et al. | |
| 2007/0074453 A1 | 4/2007 | Flannery | |
| 2008/0110412 A1 | 5/2008 | Shimoda et al. | |
| 2008/0110413 A1 | 5/2008 | Kobayashi et al. | |
| 2008/0202047 A1 | 8/2008 | Flannery | |
| 2008/0256865 A1 | 10/2008 | Trujillo et al. | |
| 2008/0265233 A1 | 10/2008 | Flannery | |
| 2008/0282613 A1 | 11/2008 | Heads | |
| 2009/0071074 A1 | 3/2009 | Yates | |
| 2009/0158665 A1 | 6/2009 | Wu | |
| 2009/0178624 A1 | 7/2009 | Hirokawa et al. | |
| 2009/0293363 A1 | 12/2009 | Flannery | |
| 2010/0282178 A1 | 11/2010 | Hirokawa et al. | |
| 2012/0084916 A1 | 4/2012 | Flannery | |
| 2012/0144745 A1 | 6/2012 | Yates et al. | |
| 2012/0233922 A1 | 9/2012 | Flannery et al. | |

* cited by examiner

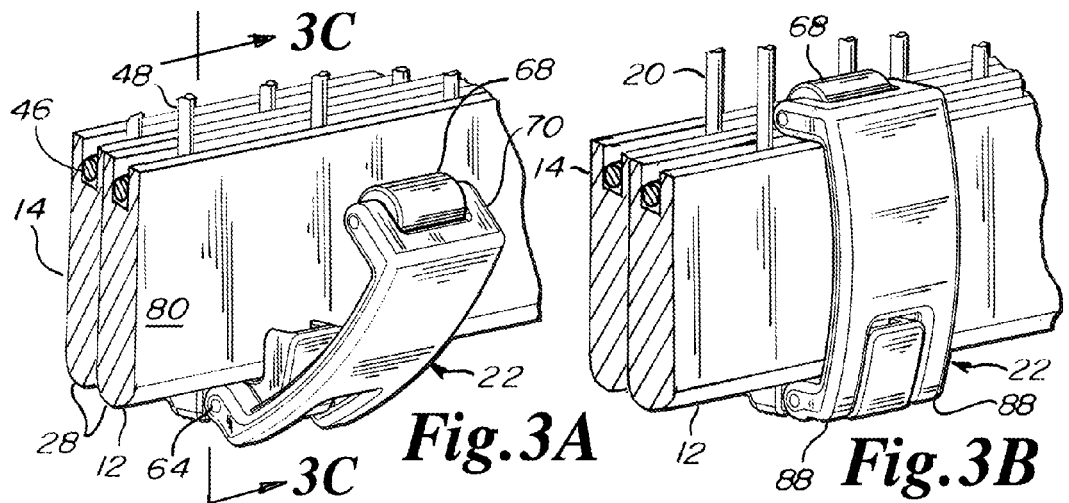
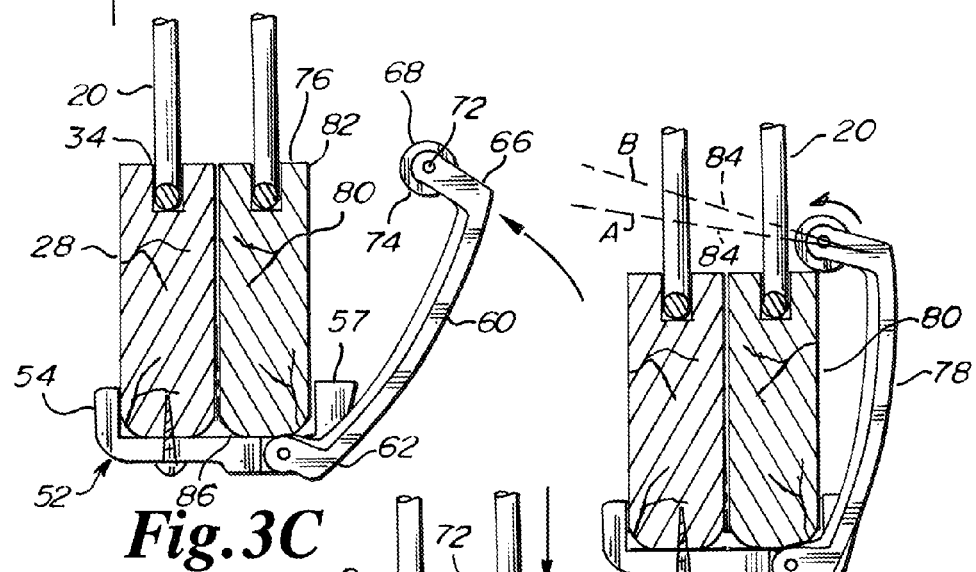
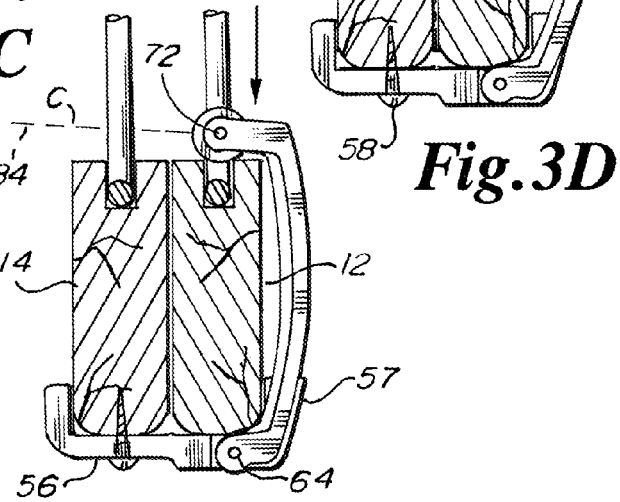

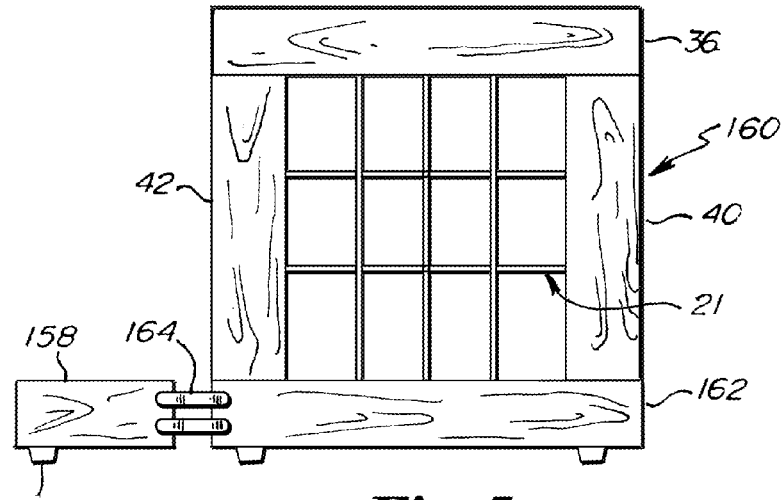
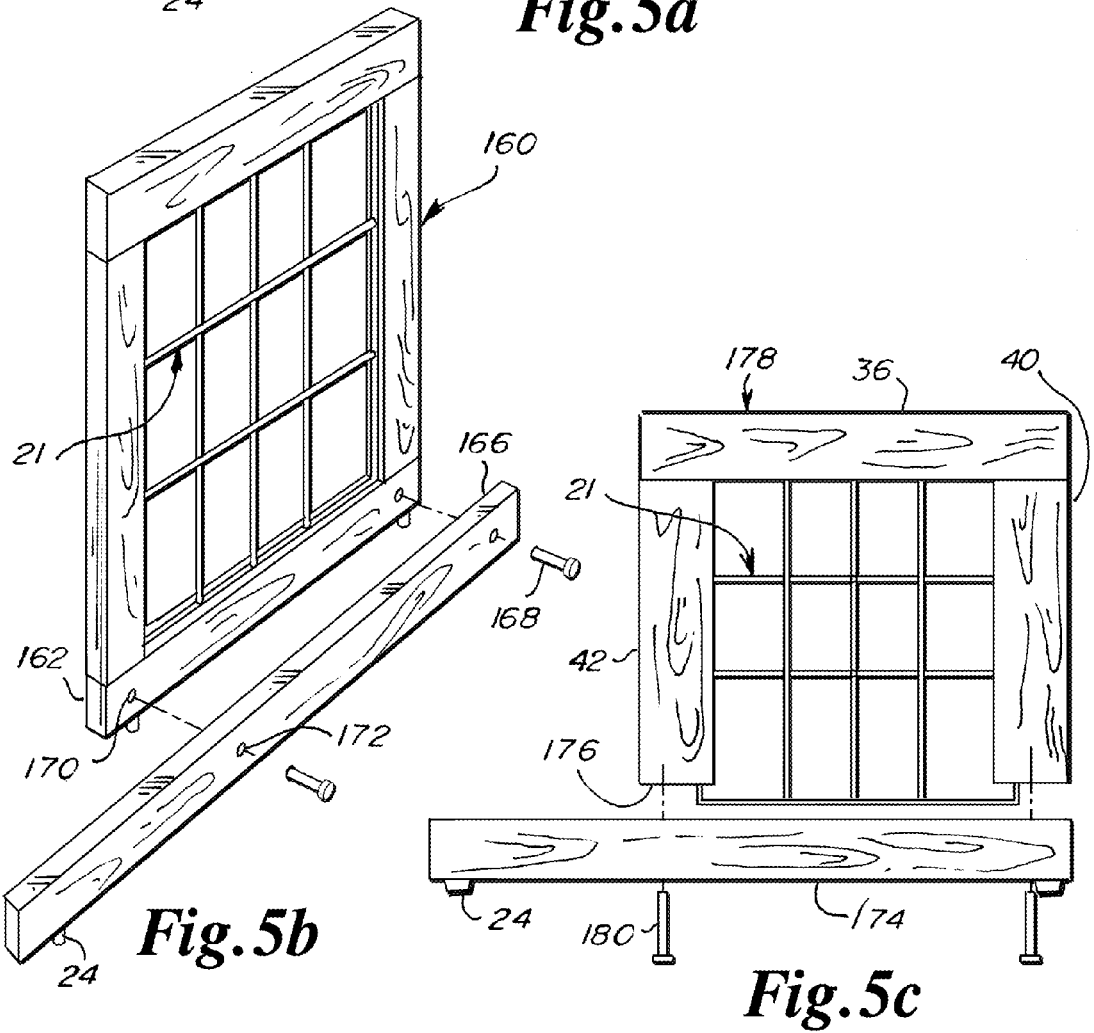

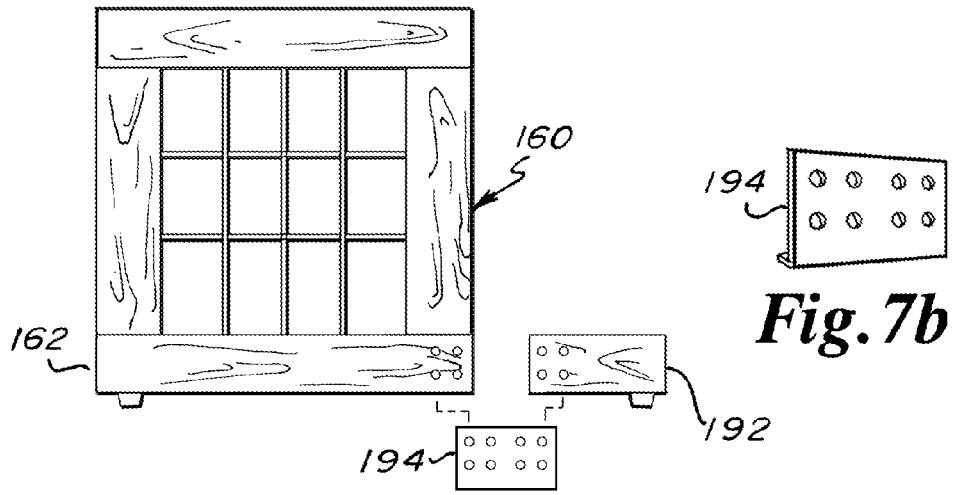
*Fig.7b*
*Fig.7a*
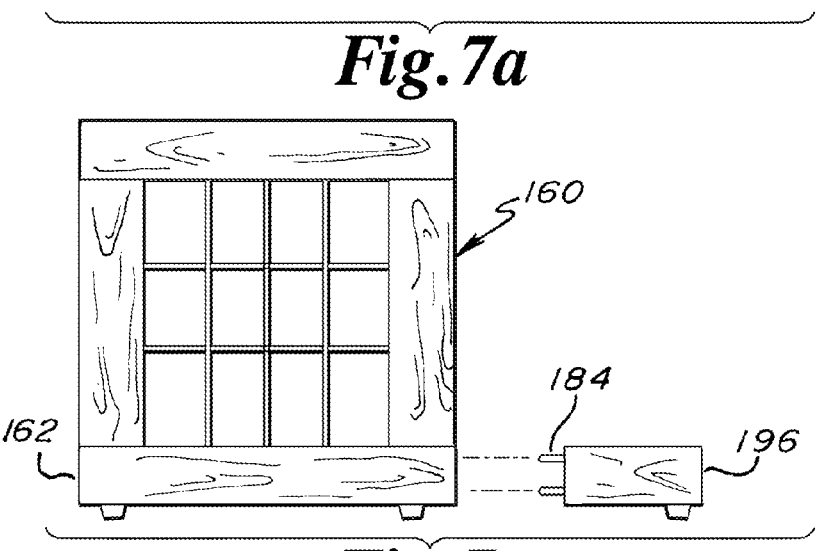
*Fig.7c*
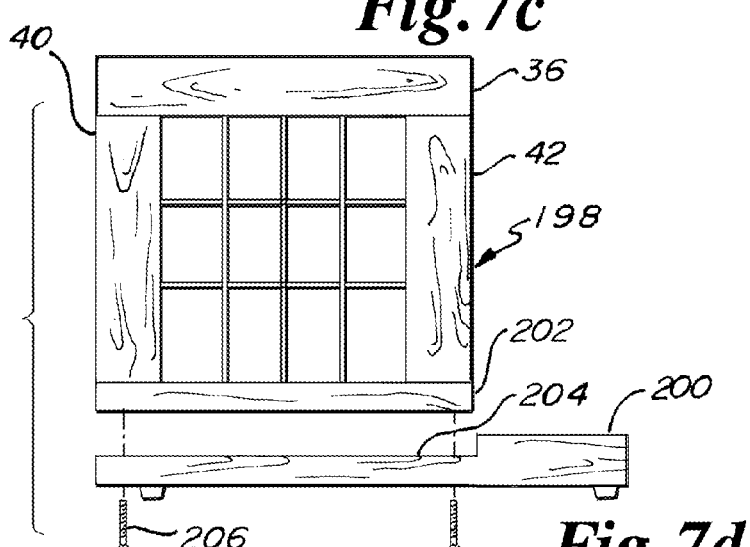
*Fig.7d*

BARRIER WITH PANELS SLIDING PARALLEL

CROSS REFERENCE TO RELATED APPLICATIONS

This application is a continuation in part of U.S. patent application Ser. No. 13/149,721 filed May 31, 2011. This application claims the benefit under 35 U.S.C. 119(e) of U.S. Provisional Patent Application No. 61/453,123 filed Mar. 15, 2011. These applications are hereby incorporated by reference in their entireties into this application.

FIELD OF THE INVENTION

The present invention relates generally to a barrier for an inside of a home, particularly to a barrier having two panels that slide parallel to each other, and specifically to such a barrier having wooden rectangular frames for aesthetic purposes and to minimize weight.

BACKGROUND OF THE INVENTION

One type of gate intended for the inside of a home may be a pressure gate that, by its structure and design, is supported by internal pressure between, for example, two door jambs. These gates are often formed of metal or include a relatively great amount of metal.

Another type of gate intended for the inside of a home may be a gate that is fixed via pin connectors to and between two opposing structures such as two opposing door jambs. These gates too are often formed of metal or include a relatively great amount of metal.

SUMMARY OF THE INVENTION

A feature of the present invention is the provision in an in-house residential barrier, of four panels cooperating with each other so as to be self-supporting or so as to stand alone, of the four panels including two main panels and two side panels, of each of the panels including a rectangular wood frame and metal grid, of each of the two side panels having a bottom horizontally extending frame member cutting through each of the planes in which the two main panels reside to extend to the front and back of each of the two main panels, and of the bottom horizontally extending frame member being one-piece and integral to minimize parts for assembly.

Another feature of the present invention is the provision in an in-house residential barrier, of a first panel including a first rectangular wood frame and a first metal grid within the first rectangular wood frame, of a second panel including a second rectangular wood frame and a second metal grid within the second rectangular wood frame, of the first and second panels being engaged to each other and being slideable relative to each other in parallel fashion, and of each of the grids being received in channels formed in inner peripheries or inner edges of the rectangular wood frames.

Another feature of the present invention is the provision in an in-house residential barrier, of a first panel comprising a first rectangular frame and a first grid within the first rectangular frame, of a second panel comprising a second rectangular frame and a second grid within the second rectangular frame, with the first and second panels being engaged to each other and being slideable relative to each other in parallel fashion, of a connector between the first and second panels, of the connector including a base, of the base traversing each of the first and second panels, of the base being fixedly connected to one of the first and second panels and including a lip for confronting the other of the first and second panels that slides within the lip, and of the connector further including a swinging clamp pivotally connected to the base and engagable to the panel that slides within the lip to fix the first and second panels relative to each other in a nonsliding fashion.

Another feature of the present invention is the provision in such an in-house residential barrier, of the swinging clamp including first and second ends, of the first end being pivotally connected to the base, and of the second end including a roller, where the roller engages the panel that slides within the lip to fix the first and second panels relative to each other in a nonsliding fashion.

Another feature of the present invention is the provision in an in-house residential barrier, of at least two main panels, and of the two main panels being slideably adjustable relative to each other and fixable relative to each other with a swinging clamp.

Another feature of the present invention is the provision in a locking mechanism for permitting first and second objects to slide by each other and for fixing the first and second objects together in a nonsliding fashion, of a base for being fixed to the first object, of a lip for confronting the second object, with the lip being engaged to the base, and of a swinging element having first and second ends, with the first end being pivotally connected to the base on a first axis, with the second end having a roller on a second axis, with the first and second axis being parallel, whereby the swinging element swings to an unlocked position in which the first and second objects can slide by each other, whereby the swinging element swings to a locked position in which the roller engages the second object and in which the first and second objects are fixed together in a nonsliding fashion.

An advantage of the present invention is that the present in-house residential barrier is lightweight. One of the features contributing to this advantage is that each of the frames of each of the panels is wood. Another feature contributing to this advantage is that each of the panels includes lightweight rods, lightweight tubes, lightweight bars or lightweight wires to run between top and bottom horizontal frame members and to run between vertical side frame members.

Another advantage of the present invention is that sharp edges are minimized. One of the features contributing to this advantage is that wood is employed to serve as rectangular frames around each of the four panels.

Another advantage of the present invention is aesthetics. The in-house residential barrier is more pleasing to the eye with wood frames around each of the four panels.

Another advantage of the present invention is that the length or width (i.e., the distance between two opposing door jambs for example) of the barrier is slideably adjustable.

Another advantage of the present invention is that the length or width (i.e., the distance between two opposing door jambs for example) of the barrier is incrementally adjustable. One feature contributing to this advantage is the swinging clamp that can lock in several positions, such as when a roller of the swinging clamp is seated in a channel that also receives the metal grids, and such as when the roller abuts a rod of the grid and rests on an edge or corner of a horizontal member without protruding into the grid.

Another advantage of the present invention is that the material used to make the two side panels has been minimized. For example, the bottom horizontally extending frame member of the side panels runs to each of the front and rear of the main panels. On the rear or rear face of the main panels, a rear section of the bottom horizontally extending frame member also serves as a portion of a fence or fence section of the barrier. However, on the front or front face of the main panels, a front section of the bottom horizontally extending frame member serves only the stabilizing purpose. This front section has been provided with a minimum height so as to minimize tripping. This front section is rectangular in shape.

Another advantage is ease of fixing the main panels relative to each other. The connector or swingable clamp or roller latch is easy to open and easy to close. The roller latch pops into or snaps into a locked position and pops out of or snaps out of the locked position. Features contributing to this ease of operation are, for example, the roller on the swinging end of the clamp, the offset in the vertical direction between the axis of the pin of the base end of the swinging clamp and the axis of the pin of the roller when the roller is seated in the channel that also receives the grid.

Another advantage is that the swinging clamp or roller latch does not mar, dent, scratch or otherwise damage the wood of the panels which the roller latch engages. Relative to many metals such as aluminum and steel, wood is a soft material.

BRIEF DESCRIPTION OF THE DRAWINGS

FIG. 3A is a perspective detail view of the swinging clamp of FIG. 1, showing the swinging clamp in an open position.

FIG. 3B is a perspective detail view of the swinging clamp of FIG. 3A, showing the swinging clamp in a closed position.

FIG. 3C is a section detail side view of the swinging clamp of FIG. 3A, showing the swinging clamp in an open position.

FIG. 3D is a section detail side view of the swinging clamp of FIG. 3A, showing the swinging clamp in a position between the open and closed positions.

FIG. 3E is a section detail side view of the swinging clamp of FIG. 3A, showing the swinging clamp in a closed position.

FIG. 5a is a side view of an alternate embodiment of a side panel and leg of the present in-house stand alone residential barrier of FIG. 1, and shows a leg spaced from, confronting, and engaging a side panel.

FIG. 5b is a perspective view of an alternate embodiment of a side panel and leg of the present in-house stand along residential barrier of FIG. 1, and shows a leg fixed to a bottom horizontal frame member of a side panel and being in a plane confronting a plane of the side panel.

FIG. 5c is a side view of an alternate embodiment of a side panel and leg of the present in-house stand alone residential barrier of FIG. 1, and shows a leg that is removably engaged to bottom ends of vertical frame members of a side panel.

FIG. 7a is a side view of an alternate embodiment of a side panel and leg of the present in-house stand alone residential barrier of FIG. 1, and shows a leg engaging a side panel with a stamped metal plate.

FIG. 7b is a perspective view of a bent metal plate used as a connection between the leg and side panel of FIG. 7a.

FIG. 7c is a side view of an alternate embodiment of a side panel and leg of the present in-house stand alone residential barrier of FIG. 1, and shows a leg engaging a side panel with a pair of wooden dowel pins.

FIG. 7d is a side view of an alternate embodiment of a side panel and leg of the present in-house stand alone residential barrier of FIG. 1, and shows a leg having a cutout for engaging a side panel from underneath.

DESCRIPTION

Figure 1:
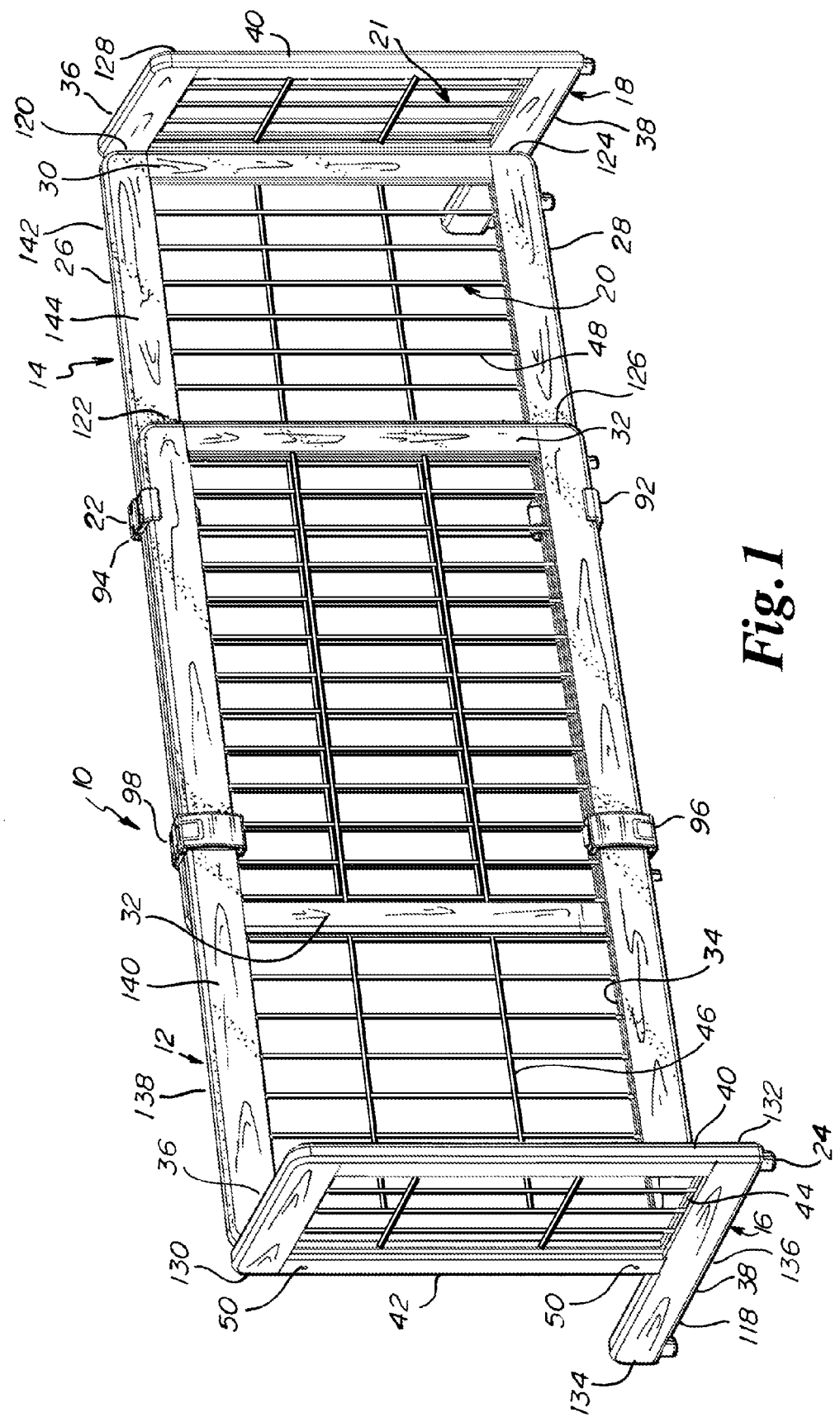
FIG. 1 is a perspective detail view of the present in-house stand alone residential barrier having main panels and side panels, with the main panels interconnected with swinging clamps.

As shown in the FIG. 1, the present self-supporting or stand alone in-house barrier with four panels is indicated by reference number 10. Self-supporting barrier 10 includes main panels 12, 14 and side panels 16, 18. Each of the panels 12, 14 includes therein a grid or mesh 20 and each of the side panels 16 and 18 includes therein a grid or mesh 21. The self-supporting barrier 10 further includes a set of four connectors 22 between the main panels 12, 14 that permit the main panels 12, 14 to slide relative to each other and that fix the main panels 12, 14 relative to each other such that the main panels 12, 14 cannot slide relative to each other. The self-supporting barrier 10 further includes a set of eight feet 24 to space the barrier 10 from a surface such as a floor.

Each of the main panels 12, 14 is rectangular and includes a rectangular wooden frame having an upper or top wooden horizontally extending frame member 26, a lower or bottom wooden horizontally extending frame member 28, an outer wooden vertically extending frame member 30, and an inner wooden vertically extending frame member 32. The reference to outer means that which is fixed close to the side panel of the respective main panel. Side panels 16, 18 are on an outside of the barrier 10 as a whole. The reference to inner means that which is fixed away from outer elements on the respective panel.

The upper and lower horizontal members 26, 28 have the same length (a direction defined as running from outer member 30 to inner member 32). The outer and inner vertical members 30, 32 have the same height (a direction defined as running from member 28 to 26). Members 26, 28, 30, 32 have the same thickness (a direction defined as running from a front face of one of the main panels 12, 14 to the rear face of the same panel).

Members 30, 32 are more narrow than members 26, 28. In other words, the length of each of members 30, 32 is less than the height of each of the members 26, 28.

The outer and inner vertical members 30, 32 are sandwiched between the upper and lower horizontal members 26, 28. In other words, the bottom edge of each of members 30, 32 engages the top edge of lower member 28. The upper edge of each of members 30, 32 engages the lower edge of upper member 26. The outer edge of outer vertical member 30 lies flush with the outer edge of upper and lower horizontal members 26, 28. The outer edge of inner vertical member 32 lies flush with the inner edge of upper and lower horizontal members 26, 28.

A grid receiving channel 34 is formed in an inner periphery or inner edge of each of the main panels 12, 14. Member 26 includes a lower edge having a channel portion formed therein, with such channel portion terminating short of the inner and outer edges of member 26. Member 28 includes an upper edge having a channel portion formed therein, with such channel portion terminating short of the inner and outer edges of member 26. Each of members 30, 32 includes an inner vertical edge having a channel portion formed therein, with such channel portion opening out of the upper and lower edges of the members 30, 32. As a whole, such channel portions of members 26, 28, 30 and 32 communicate with each other and make up channel 34. Channel 34 receives upper, lower and side edges of the grid 20 and retains the grid 20 in its respective main panel 12 or 14. Channel 34 is formed midway between opposing faces of the rectangular frame portion in which it is formed.

Side panels 16, 18 are formed identically to main panels 12, 14 except that side panels 16, 18 are shorter in length and except that each of the side panels includes a relatively long lower horizontal member. In other words, each of side panels 16, 18 includes a rectangular wooden frame having an upper or top wooden horizontally extending frame member 36, a lower or bottom wooden horizontally extending frame member 38, an outer wooden vertically extending frame member 40, and an inner wooden vertically extending frame member 42.

The upper and lower horizontal members 36, 38 have a different length (a direction defined as running from member 40 to 42). Lower member 38 is generally about twice the length of upper member 36. Lower member 38 forms an inverted T-shape with vertical member 42.

The outer and inner vertical members 40, 42 have the same height (a direction defined as running from member 38 to 36). Members 36, 38, 40, 42 have the same thickness (a direction defined as running from an outside face of one of the side panels 16, 18 to the inner face of the same side panel).

Members 40, 42 are more narrow than members 36, 38. In other words, the length of each of members 40, 42 is less than the height of each of the members 36, 38.

The outer and inner vertical members 40, 42 are sandwiched between the upper and lower horizontal members 36, 38. In other words, the bottom edge of each of members 40, 42 engages the top edge of lower member 38. The upper edge of each of members 40, 42 engages the lower edge of upper member 36. The outer edge of outer vertical member 40 lies flush with the outer edge of upper and lower horizontal members 36, 38. The outer edge of inner vertical member 42 lies flush with the inner edge of upper and lower horizontal members 36, 38.

A grid receiving channel 44 is formed in an inner periphery of each of the side panels 16, 18. Member 36 includes a lower edge having a channel portion formed therein, with such channel portion terminating short of the inner and outer edges of member 36. Member 38 includes an upper edge having a channel portion formed therein, with such channel portion terminating at one end just beyond the junction between the inner edge of outer vertical member 40 and the upper edge of member 38 and at the other end just beyond the junction between the inner edge of inner vertical member 42 and the upper edge of member 38. Each of members 40, 42 includes an inner vertical edge having a channel portion formed therein, with such channel portion opening out of the upper and lower edges of the members 40, 42. As a whole, such channel portions of members 36, 38, 40 and 42 communicate with each other and make up channel 44. Channel 44 receives upper, lower and side edges of the grid 21 and retains the grid 21 in its respective side panel 16 or 18. Like channel 34, channel 44 is formed half-way between the faces of the rectangular frame portion in which it is formed.

Each of the grids 20, 21 includes four horizontally extending rods 46 spaced apart equidistantly from each other. The upper and lower horizontal rods 46 of each of grids 20, 21 is set in its respective channel portion of the upper horizontal member 26, 36 or lower horizontal member 28, 38. The middle pair of horizontal rods 46 are exposed to view.

Each of the grids 20, 21 includes a set of vertically extending rods 48 spaced apart equidistantly from each other. Grid 20 includes twenty-two vertically extending rods 48. Grid 21 includes four vertically extending rods. The innermost and outermost vertically extending rods 48 are set in its respective channel portion of the outer and inner vertical members 30, 32, 40, 42. The remaining vertically extending rods 48 are exposed to view.

Panel 12 includes a pair of feet 24, where one foot 24 is engaged to the lower edge of lower horizontal member 28 at an inner end portion of the lower horizontal member 28 and adjacent to the inner vertical member 32 of panel 12, and where the other foot 24 is engaged to the lower edge of lower horizontal member 28 at an outer end portion of lower horizontal member 28 and adjacent to the outer vertical member 30 of panel 12. Panel 14 also includes a pair of feet 24, where one foot 24 is engaged to the lower edge of lower horizontal member 28 at an inner end portion of the lower horizontal member 28 and adjacent to the inner vertical member 32 of panel 14, and where the other foot 24 is engaged to the lower edge of lower horizontal member 28 and adjacent to the outer vertical member 30 of panel 14. A pair of feet 24 affixed to each of the panels 12, 14 (rather than a single foot 24 on each of the panels 12, 14) keeps the respective horizontal members 28 (and the upper members 26) more parallel with each other and leads to a smoother sliding between members 28 (and member 26) in their respective connectors 22. Each of side panels 16, 18 includes a pair of feet 24 engaged at opposite end portions of lower horizontal member 38 and engaged to the lower edge portion of lower horizontal member 38. Feet 24 space the barrier 10 from a surface such as a floor. Feet 24 are frustoconical in shape and taper inwardly and downwardly. Feet 24 are fixed to their respective panels 12, 14, 16, 18 with a pin connector. Feet 24 are formed from a resilient plastic or resilient elastomer that allows for sliding on a floor but minimizes excessive sliding and minimizes slipping on smooth surface such as wood or tile.

Barrier 10 is maintained in an upright self-supporting or stand alone position by fixing the side panels 16, 18 to the main panels 12, 14 such that side panel 16 forms a T-shape with main panel 12 and such that side panel 18 forms a T-shape with main panel 14. A pair of pin connectors 50 run from inner vertical member 42 to outer vertical member 30 to fix the side panels 16, 18 to the main panels 12, 14 in the T-shape. Pin connectors 50 are readily removable. Pin connectors 50 pass through metal receptors set in vertical members 42 and engage threaded metal receptors set in vertical members 30.

Connector 22 connects the main panels 12, 14 to each other and permits the main panels 12, 14 to slide parallel to each other. Connector 22 is in the nature of a swinging clamp or over-center clamp, where over-center is defined by the body of the connector 22 first being at rest, then by the body of the connector 22 flexing, and then by the body of the connector 22 returning at least partially from the flexed state to the locked state.

Connector 22 includes a base 52. Base 52 includes a first side section or lip 54, a traversing section 56, and a second side section or lip 57. Sections 54, 57 are set at a right angle to traversing section 56 such that base 52 is C-shaped. First side section 54 confronts one of the outside faces of one of the upper or lower horizontal members 26, 28. Traversing section 56 confronts each of the horizontal members 26, 28. Second side section 57 confronts one of the outside faces of the other of the upper or lower horizontal member 26, 28. Base 52 is fixed to one of the upper or lower horizontal members 26, 28 by a pair of pin connectors 58 extending through the traversing section 56.

Connector 22 further includes a roller latch or swinging clamp or locking mechanism 60 that is swingably fixed to an end of the traversing section 56 that is distal of the side section 54 and proximal to side section 57. Swinging clamp 60 includes a base end 62 affixed to traversing section 56 by a pin connector 64. Swinging clamp 60 includes a clamping or bifurcated end 66 that includes a roller 68. Clamping end 66 is bifurcated or forked to receive the roller 68 between the bifurcated portions 70. Roller 68 rolls on an axis defined by pin connector 72 running through the bifurcated portions 70 and roller 68. Roller 68 has a cylindrical outer surface 74 that extends beyond outer surfaces of the bifurcated portions 70 so as to engage an edge 76 of upper or lower horizontal member 26, 28. Edge 76 can be an upper edge of lower horizontal member 28 or a lower edge of upper horizontal member 26.

Swinging clamp 60 may be referred to as an over-center clamp. Clamp 60 includes a body 78 between the base end 62 and the bifurcated end 66. Body 78 is plastic and is one-piece and integral with base end 62 and bifurcated end 66. Body 78 is resilient. When swinging clamp 60 is swung toward edge 76, roller 68 may first make contact with a face 80 of member 26 or 28 or a corner 82 formed by face 80 and edge 76. As the swinging clamp 60 is swung further into a clamping position, one or more of body 78, base end 62, bifurcated end 66, pin connector 72 and roller 68 may flex to permit travel of the roller 68 over corner 82 and onto edge 76. Bifurcated end 66 is elongate and straight and includes an axis 84. Prior to the roller 68 making contact with one or more of face 80, corner 82 or edge 76, axis 84 has a position A as shown in FIG. 3D. In position A, clamp 60 is unflexed. When clamp 60 flexes upon contact with one or more of corner 82, face 80 or edge 76, axis 84 may have a position B as shown in FIG. 3D. As roller 68 rolls over one or more of face 80, corner 82 or edge 76 and into a position where body 78 more closely confronts face 80, clamp 60 attains an over-center position C as shown in FIG. 3E. In position C, axis 84 may extend at an angle between the angles of axis 84 shown by position A and B in FIG. 3D. In the over-center position shown in FIG. 3E, roller 68 may engage the channel 34 such that channel 34 serves as a seat for roller 68, which holds one of the horizontal members 26, 28 stationary relative to the other of the horizontal members 26, 28.

When the clamp 60 is pushed or pulled out of the channel or seat 34 and rotated or swung to an out-of-the-way position where roller 68 is free of horizontal members 26, 28, the horizontal members 26, 28 may slide relatively to each other. An edge 86 of one of the horizontal members 26, 28 slides on the traversing section 56 and face 80 slides by second section 57 of the base 52.

Base 52 includes the first side section 54, the traversing section 56, and the second side section 57. Base 52 is integral and one-piece. First side section 54, traversing section 56, and second side section 57 are integral and one-piece with each other. Second side section 57 extends at a right angle to traversing section 56. Second side section 57 extends parallel to first side section 54. Second side section 57 is a lip that guides and retains one of the horizontal members 26, 28 as the horizontal members 26, 28 slide relatively to each other.

As shown in FIG. 3A, swinging clamp 60 includes bifurcated portions 88 at the swing base end 62 as well as bifurcated portions 70 at the clamping end 66. Bifurcated portions 88 are fixed to traversing section 56 by pin connector 64. Bifurcated portions 88 form a cutout for reception therein of second side section 57 that confronts the sliding face 80 of one of the horizontal members 26, 28.

As shown in FIG. 3E, pin 64 defines a horizontal axis for swinging of base end 62 and pin 72 defines a horizontal axis for rolling of roller 68. The horizontal axes of pins 64 and 72 are offset from each other in the vertical direction. In other words, lower horizontal member 28 of panel 12 includes a vertical plane splitting the member 28 into two one-half sections. The horizontal axis of pin 72 lies in this vertical plane when the roller 68 is seated in the channel 34. At all times, since pin 64 is fixed at one location, the horizontal axis of pin 64 lies between such vertical plane and the plane defined by face 80 of lower horizontal member 28 of panel 12. The horizontal axes of pins 64 and 72 are parallel to each other. The horizontal axis of pin 64 is disposed between the vertical plane splitting member 28 into equal half-sections and the vertical plane of face 80. With such a structure or relationship between pins 64 and 72, roller 68 is more securely seated in channel 34. With such a structure of relationship between pins 64 and 72, clamp 60 can secure in a nonsliding fashion two adjacent panels 12, 14 together prior to when roller 68 is seated in channel 34; for example, roller 68 can make head on contact with one of the vertical rods 48, can securely pinch against edge 76 and/or corner 82, and can in this position secure in nonsliding fashion two adjacent panels 12, 14 together such that panels 12, 14 can be incrementally adjusted in length relative to each other.

As shown in FIG. 1, barrier 10 includes four connectors 22. Each of these connectors 22 are identical. However, for discussion purposes, these connectors are hereby given different reference numbers, namely, 92, 94, 96, and 98.

Connector 92 is fixed with connector pin 56 to the lower horizontal member 28 of main panel 12 and permits sliding movement thereby of lower horizontal member 28 of main panel 14. Connector 92, via roller 68, releasably fixes thereto lower horizontal member 28 of main panel 14.

Connector 94 is fixed with connector pin 56 to the upper horizontal member 26 of main panel 12 and permits sliding movement thereby of upper horizontal member 28 of main panel 14. Connector 94, via roller 68, releasably fixes thereto upper horizontal member 28 of main panel 14.

Connector 96 is fixed with connector pin 56 to the lower horizontal member 28 of main panel 14 and permits sliding movement thereby of lower horizontal member 28 of main panel 12. Connector 96, via roller 68, releasably fixes thereto lower horizontal member 28 of main panel 12.

Connector 98 is fixed with connector pin 56 to the upper horizontal member 26 of main panel 14 and permits sliding movement thereby of upper horizontal member 28 of main panel 12. Connector 98, via roller 68, releasably fixes thereto upper horizontal member 28 of main panel 12.

Connectors 92, 94 are fixed with connector pin 56 to an outer end portion of main panel 12. Connectors 96, 96 are fixed with connector pin 56 to an outer end portion of main panel 14.

In operation, to fashion a relatively wide gate, the swinging clamps 60 of each of the connectors 92, 94, 96, 98 are disengaged from their respective upper or lower horizontal member 26, 28. Upon such a disengagement, the main panels 12, 14 can slide by each other and outwardly where the outer vertical members 30 slide away from each other. This outward sliding stops when the inside edges of connectors 92, 94 make contact with the inside edges of connectors 96, 98.

To fashion a relative narrow gate, the swinging clamps 60 of each of the connectors 92, 94, 96, 98 are disengaged from their respective upper or lower horizontal member 26, 28. Upon such a disengagement, the main panels 12, 14 can slide by each other and inwardly where the outer vertical members 30 slide toward each other. This inward sliding stops when the outer vertical edge of inner vertical member 32 of main panel 12 makes contact with the upper and lower horizontal members 36, 38 of side panel 18 and when the outer vertical edge of inner member 32 of main panel 14 makes contact with the lower horizontal member 38 of side panel 16.

To manufacture the barrier 10, lower horizontal member 28 can be fixed, such as with glue, to outer and inner vertical members 30, 32 so as to form a C-shaped frame. Then grid 20 can be slid into the channel portions of the channel 34 of the outer and inner vertical members 30, 32 and further slid into the channel portion of the channel 34 of the lower horizontal member 28. Then the upper horizontal member 26 can be set on the upper ends of the outer and inner vertical members 30, 32 so as to receive the upper horizontal rod 46 in the channel portion of the channel 34 of the upper horizontal member 26. Then the upper ends of the outer and inner vertical members 30, 32 can be fixed, such as with glue, to the outer and inner ends of the upper horizontal member 26 to encapsulate the grid 20 in one of the main panels 12, 14. It should be noted that four pieces capture grid 20 and that these four pieces can be set about the grid 20 in any sequence. For example, upper and lower horizontal members 26, 28 can first be set on the grid 20. Then the outer and inner vertical members 30, 32 can be brought onto the grid 20 and then glued to the upper and lower horizontal members 26, 28. Except for being captured or entrapped in the channel 34, grid 20 is not otherwise affixed to the main panel 12, 14 such that there is play (small vertical and horizontal movement of the grid 20) between the grid 20 and the main panel 12 or 14. Grid 21 can be encapsulated in each of the side panels 16, 18 in the same way as grid 20 is encapsulated.

Barrier 10 shown in FIG. 1 is a self-supporting or stand alone barrier. It requires no connection to a vertically running surface, such as the vertically running surface of a door jamb or wall, to keep the main panels 12, 14 upright. The T-connection between side panel 16 and main panel 12 and the T-connection between side panel 18 and main panel 14 maintains the interconnected panels 12, 14 in an upright position.

Barrier 10 shown in FIG. 1 can be self-supporting or stand alone with just one of the side panels 16, 18. In other words, with side panel 18 removed, side panel 16 and the T-connection the side panel 16 makes with main panels 12 and 14 is sufficient to hold main panels 12, 14 in the upright position. Panels 12, 14 can be slid relative to each other in the three paneled embodiment. A three paneled embodiment can also be formed with side panel 18, main panel 12 and main panel 14.

Figure 2:
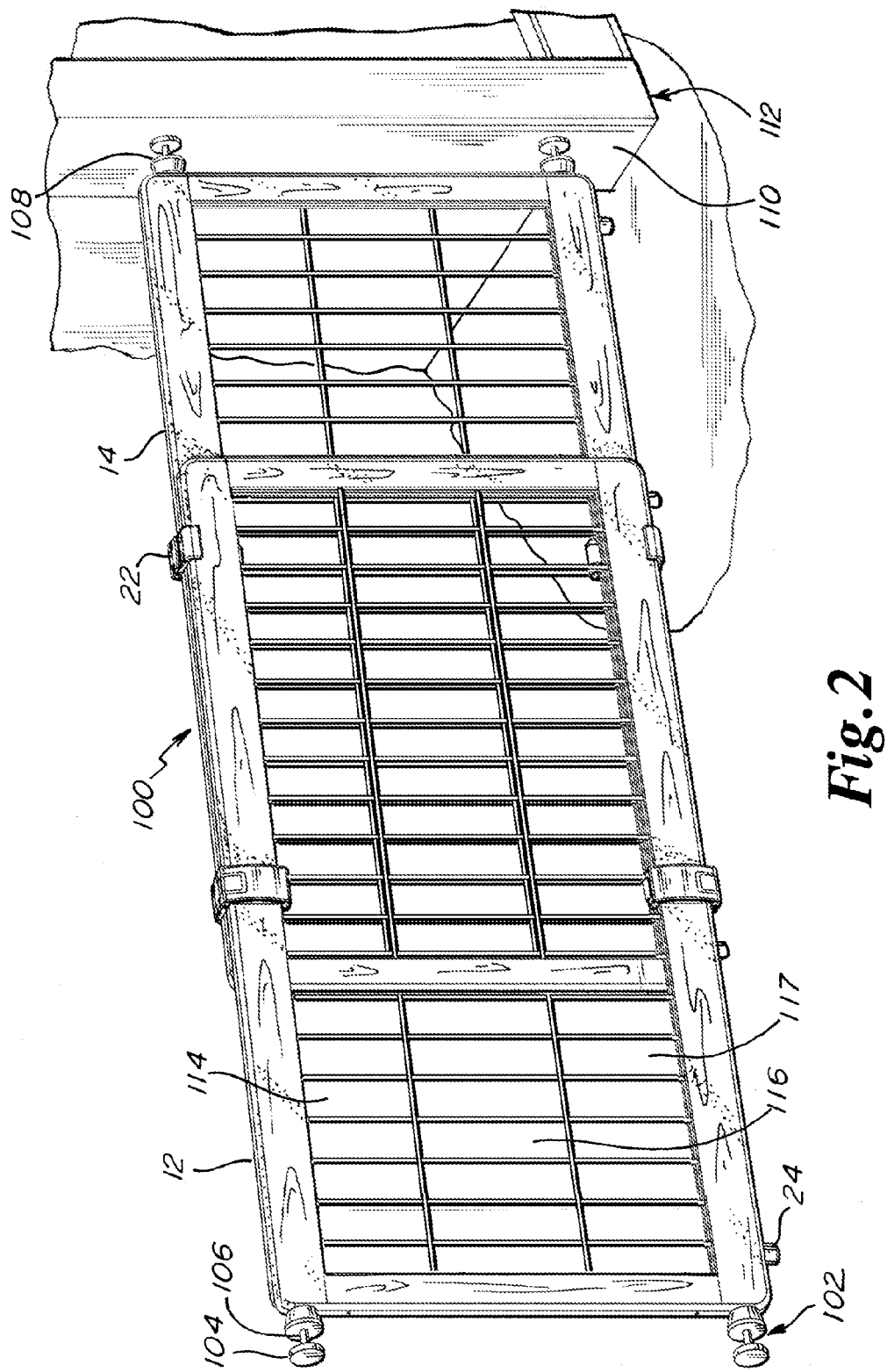
FIG. 2 is a perspective detail view of the present in-house residential barrier of FIG. 1, where the barrier includes the main panels of FIG. 1 interconnected with swinging clamps, where the barrier does not include the side panels of FIG. 1, and where the barrier further includes in-line connectors between the main panels and a vertical surface.

As shown in FIG. 2, pressure barrier 100 includes neither side panel 16 nor side panel 18 but does includes each of the main panels 12, 14 and their features. In lieu of the side panels 16, 18, barrier 100 includes a set of four in line connectors 102. Each of the connectors 102 includes fixed knob 104 set on the proximal end of a threaded shaft 106. Fixed knob 104 and shaft 106 turn as one unit. Fixed knob 104 and shaft 106 do not rotate relative to each other. Connector 102 further includes a rotating threaded spacer or knob 108 that mates with and turns on threaded shaft 106 from a proximal end to a distal end of the shaft 106. The distal end of the shaft 106 is inserted into an opening formed on the outer edge of outer vertical member 30 of main panels 12, 14. The opening into which the distal end of shaft 106 is inserted extends horizontally into the upper or lower horizontal member 26, 28 and can consist of a metal or plastic receiver that is threaded or non-threaded so as to be cylindrical. The opening into which the distal end of shaft 106 is inserted may not include a metal or plastic receiver, may not be lined in any fashion, and may be cylindrical. Both the fixed knob 104 and rotating knob 108 have diameters that are greater than the shaft 106. Fixed knob 104 is shaped in the form of a disk and has an outside roughened face with a relatively great amount of surface area to make contact with a vertically running surface such as the vertically running surface 110 of a door jamb 112. Rotating knob 108 includes an inner smooth surface with a relatively great amount of surface area to make contact with the outer edge of the outer vertical member 30 of main panel 12 or 14. By turning knob 108 and running knob 108 back and forth along the shaft 106 from the distal end to the proximal end, connectors 108 can incrementally be adjusted to a certain width between two vertically running surfaces such as the vertically running surfaces 110 of two door jambs 112. Connectors 108 may hold barrier 100, including feet 24, above the floor and upright at the same time. Connectors 108 may hold barrier 100 upright and, at the same time, feet 24 may engage the floor. As well as adjusting connectors 102 in the horizontal direction, connectors 22 can be operated to adjust the main panels 12, 14 relative to each other horizontally. In other words, to adjust the effective or total length of barrier 100, an operator has the options of adjusting only the connectors 22, or adjusting one or more of the connectors 102, or adjusting the connectors 22 and one or more of the connectors 102.

Each of the main panels 12, 14 has an upper visible horizontally extending rod 46 and a lower visible horizontally extending rod 46. The upper visible horizontally extending rod 46 is set at about one-third of the distance from the lower edge of top horizontal member 26 to the upper edge of lower horizontal member 28. Lower horizontally extending rod 46 is set at about two-thirds of the distance from the lower edge of top horizontal member 26 to the upper edge of lower horizontal member 28. A first space 114 between the upper visible horizontally extending rod 46 and the lower edge of top horizontal member 28 has only interrupting vertical members. A second space 116 between the upper visible horizontally extending rod 46 and lower visible horizontally extending rod 46 has only interrupting vertical members. A third space 117 between the lower visible horizontally extending rod 46 and the upper edge of the lower horizontal member 28 has only interrupting vertical members. Vertically extending rods 48 are the interrupting vertical members.

None of the first, second or third spaces 112, 114, 116 of grid 20 takes up at least a three-fifths portion (60%) of the open space running from the lower edge of top horizontal member 26 to the upper edge of the lower horizontal member 28. Each of the first, second, and third spaces takes up about 33% of the open space running from the lower edge of the top horizontal member 26 to the upper edge of the lower horizontal member 28. Grid 21 has the same first, second, and third spaces taking up, respectively, about 33% of such open space. The structure, or pattern, of the rods or wires of grid 20 is the same as the structure, or pattern, of the rods or wires of grid 21.

Each of the side panels 16, 18 includes a lower horizontal member 38. Each of the lower horizontal members 38 includes a front or forwardly or laterally extending leg 118 that extends forwardly of or beyond a plane defined by the main panel 12, 14 to which the leg 118 is directly connected. Leg 118 is one-piece and integral with the lower or bottom wooden horizontally extending frame member 38 of side panel 16, 18. Frame member 38 of side panel 16, 18 is in turn connected to vertically extending member 42 of side panel 16, 18. Member 42 of side panel 16, 18 is in turn connected to its respective main panel 12, 14.

It should be noted that legs 118 are not directly connected to their respective main panels 12, 14. Instead, such legs 118 lead integrally into their respective lower or bottom horizontally extending frame members 38, which in turn are connected to their respective vertically extending members 42, which in turn are connected to their respective main panels 12, 14. The vertically extending members 42 are connected via pin connectors 50 that extend from vertically extending members 42 to their respective vertically extending members 30 of the main panels 12, 14.

The barrier 10 includes a set of four transversely extending slide connectors 92, 94, 96, 98 that slidingly connect the main panels 12 and 14 to each other. Connectors 92, 94 are rigidly affixed to main panel 12 and are offset from (or spaced apart from) the inner vertically extending frame member 32 of main panel 12. Connectors 96, 98 are rigidly affixed to main panel 14 and are offset from (or spaced apart from) the inner vertically extending frame member 32 of main panel 14.

The slide connectors 92, 94, 96, 98 are structured such that main panels 12, 14 are continuously slideable incrementally past each other to positions that have been previously undefined. In other words, a position where main panel 12 stops and a position where main panel 14 stops are determined not by predefined structures present on main panels 12, 14, but by the width of a unique opening found in a residential home. Slide connectors 92, 94, 96, 98 grip the top and lower frame members 26, 28 with a friction fit between vertical rods 48 or on edge 76 between rods 48 and face 80.

The in-house residential barrier 10 is employed to keep children or pets in or out of certain areas in the house. The barrier 10 includes a pair of main panels 12, 14, each of which includes a rectangular frame and a set of vertically extending rods 48 and horizontally extending rods 46 within the rectangular frame.

The rectangular frame of each of the panels 12, 14 includes a top horizontally extending frame member 26, a bottom horizontally extending frame member 28, an outer vertically extending frame member 30, and an inner vertically extending frame member 32.

The top horizontally extending frame member 26 includes an outer end 120 and an inner end 122. The bottom horizontally extending frame member 28 includes an outer end 124 and an inner end 126. The outer vertically extending frame member 30 confronts the outer ends 120, 124 of the top and bottom horizontally extending frame members 26, 28. The inner vertically extending frame member 32 confronts the inner ends 122, 126 of the top and bottom horizontally extending frame members 26, 28.

The grid 20 or set of vertically and horizontally extending rods includes horizontal rods 46 extending to and between the outer and inner vertically extending frame members 30, 32. The vertical rods 48 extend to and between the top and bottom horizontally extending frame members 26, 28.

Each of the side panels 16, 18 includes a rectangular frame and a grid or set 21 of vertically extending rods 48 and horizontally extending rods 46 within the rectangular frame.

The rectangular frame of each of the side panels 16, 18 includes an upper horizontally extending frame member 36, a bottom horizontally extending frame member 38, an outer or rear vertically extending frame member 40, and an inner or front vertically extending frame member 42.

The top horizontally extending frame member 36 includes an outer end 128 and an inner end 130. The bottom horizontally extending frame member 38 includes a pair of ends 132, 134. The outer vertically extending frame member 40 confronts the outer end 128 of the top horizontally extending frame member 36 and an end 132 of the bottom horizontally extending frame member 38. The inner vertically extending frame member 42 confronts the inner end 130 of the top horizontally extending frame member 36 and a midsection 136 of the bottom horizontally extending frame member 38.

The grid or set 21 of vertically and horizontally extending rods of each of the side panels 16, 18 includes horizontal rods 46 extending to and between the outer and inner vertically extending frame members 40, 42 and vertical rods 48 extending to and between the top and bottom horizontally extending frame members 36, 38.

The first panel 12 is engaged to the second panel 14. The first panel 12 lies generally in a first plane. The second panel 14 lies generally in a second plane. The first and second planes of the panels 12, 14 are parallel to each other.

The third panel 16 is engaged to the first panel 12. The third panel 16 lies generally in a third plane. The first and third planes of the first and third panels 12, 16 are generally at a right angle to each other.

The fourth panel 18 is engaged to the second panel 14. The fourth panel 18 lies generally in a fourth plane. The second and fourth planes of the second and fourth panels 14, 18 are generally at a right angle to each other. The fourth plane of the fourth panel 18 is parallel to the third plane of the third panel 16.

The first plane or the first panel 12 includes a first front face 138 and a first rear face 140. The bottom horizontally extending member 38 extends beyond each of the first front and rear faces 138, 140. The top horizontally extending member 36 extends only beyond the first rear face 140. The inner vertically extending frame member 42 of side panel 16 confronts the outer vertically extending frame member 30 of main panel 12.

The second plane or the second main panel 14 includes a front face 142 and a rear face 144. The bottom horizontally extending member 38 of side panel 18 extends beyond each of the front and rear faces 142, 144, and further extends beyond each of the front and rear faces 138, 140. Also, bottom horizontally extending member 38 of side panel 16 extends beyond each of the front and rear faces 142, 144 of main panel 14. The top horizontally extending member 36 of side panel 18 extends beyond the rear face 144 and beyond the rear face 140. The top horizontally extending member 36 of side panel 16 also extends beyond the rear face 144 of main panel 14. The inner vertically extending frame member 42 of side panel 18 confronts the outer vertically extending frame member 30 of main panel 14.

The first panel 12 overlaps the second panel 14. The outer vertically extending frame member 30 of first panel 12 is incrementally and slideably adjustable to and away from the inner vertically extending frame member 32 of the second panel 14. The outer vertically extending frame member 30 of the second panel 14 is incrementally and slideably adjustable to and away from the inner vertically extending frame member 32 of the first panel 12. Also, the outer vertically extending frame members 30 of the main panels 12, 14 are incrementally and slideably adjustable to and away from each other.

Also, the inner vertically extending frame members 32 of the main panels 12, 14 are incrementally and slideably adjustable to and away from each other.

The barrier 10 includes a pair of feet 24 depending from the bottom horizontally extending frame member 38 of each of the side panels 16, 18. Each foot 24 of such pair of feet depend from an end portion of the bottom horizontally extending frame member 38 to space an underside of the bottom horizontally extending frame members 38 from a floor.

The barrier 10 further includes a set of feet 24, where a first pair of feet 24 depends from bottom horizontally extending frame member 28 of first panel 12, and where a second pair of feet 24 depends from bottom horizontally extending frame member 28 of second panel 14 to space the undersides of the bottom horizontally extending frame members 28 from a floor.

The horizontal rods 46 of each of the grids 20, 21 are spaced equidistantly from each other. The vertical rods 48 of each of the grids 20, 21 are spaced equidistantly from each other.

Each of the first and second rectangular frames of the first and second panels 12, 14 is formed from and consists essentially of wood. Each of the third and fourth rectangular frames of the third and fourth panels 16, 18 is formed from and consists essentially of wood.

Frames of panels 12, 14, may be formed of distinct horizontally and vertically running frame members, where members 26, 28, 30 and 32 are formed of a natural wood product or a molded or synthetic wood product. Frames of panels 12, 14, 16, 18 may be integral and one-piece where the frames of such panels 12, 14, 16, 18 are formed of a molded or synthetic wood product and where, in such a case, grids 20, 21 are set therein prior to or during the molding or fabrication process.

Figure 4:
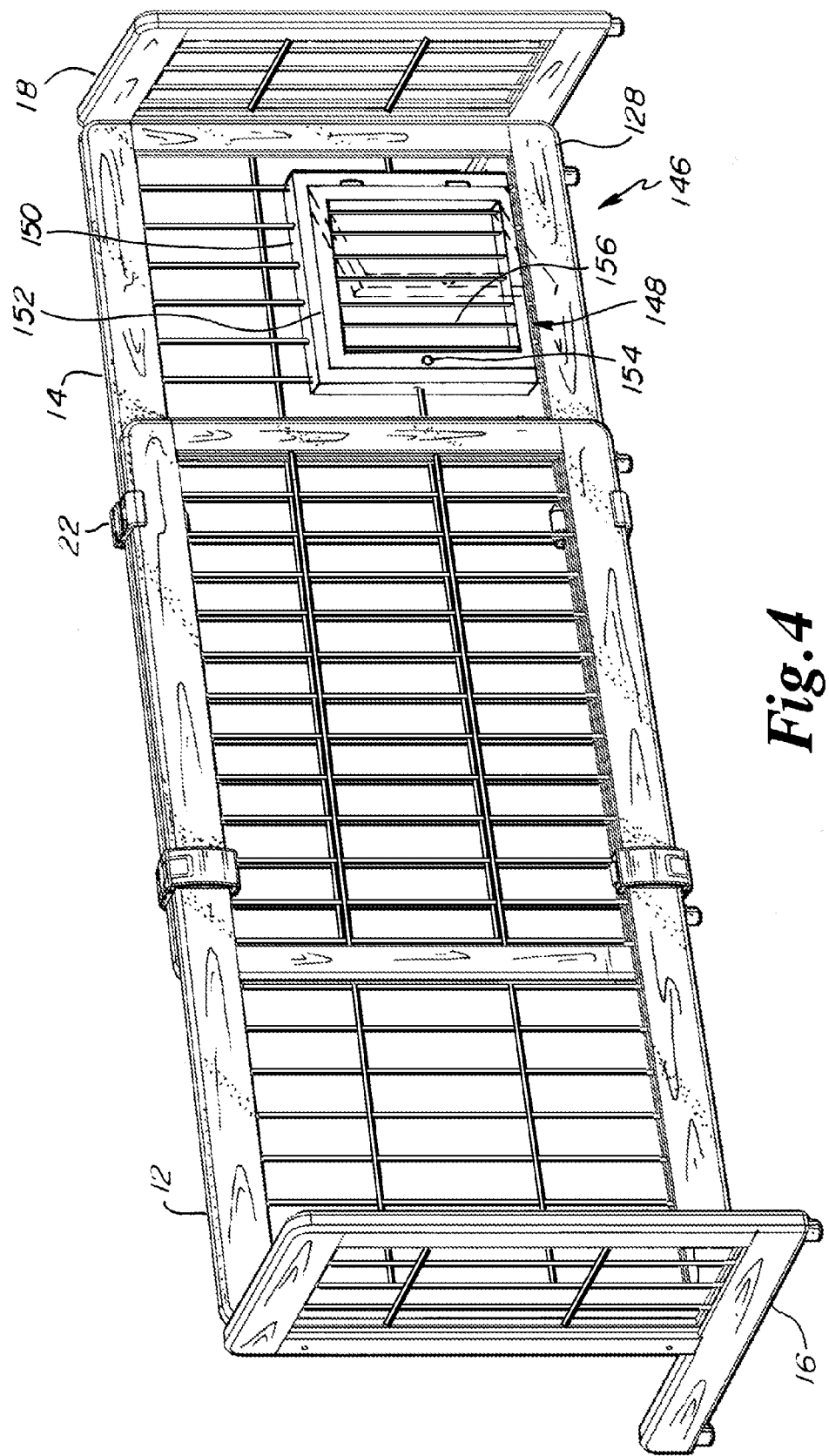
FIG. 4 is a perspective detail view of the present in-house residential barrier of FIG. 1 having main panels and side panels, with the main panels interconnected with swinging clamps, and with one of the main panels having a pet door.

FIG. 4 shows an embodiment or barrier 146. Barrier 146 is identical to barrier 10 shown in FIG. 1, except that barrier 146 includes a pet door 148. Pet door 148 can have a wooden, metal, or plastic outer frame 150 that is anchored in main panel 14 by vertical and horizontal rods 46, 48 engaging upper and side portions of the frame 150. Frame 150 is generally three sided, with the fourth side being defined by the bottom horizontally extending frame member 28. Pet door 148 further includes an inner frame 152 that is hingedly connected to the outer frame 150 and swings toward the rear face 144 of main panel 14. Inner frame 152 sits inside of outer frame 150 when the pet door 148 is closed, i.e., when inner frame 152 is closed. Inner frame 152 includes a latch 154 to engage and disengage the frames 150, 152 to and from each other. Inner frame 152 includes vertical rods 156 and, if desired, may include horizontally extending rods. Pet door 148 is sufficiently large to permit cats and small dogs to pass therethrough. Pet door 148 is sufficiently small to prevent toddlers or crawling babies from passing through or may be sized sufficiently small to prevent a large dog from passing through.

Rods 46, 48 of grids 20, 21 and rod 156 of the grid in pet door 148 may be bars or tubes or wires or other elongate, relatively narrow members. Vertical rods 48 and horizontal rods 46 cross each other at junctions. The rods 46, 48 may be welded or otherwise engaged at such junctions. The rods 46, 48 may be woven relative to each other so as to alternatively pass frontwardly and rearwardly of the other.

Rods 46, 48, 156 extend from a central section of the respective frame member to which such rod is anchored, i.e., midway between, for example, the front face 142 and the rear face 144 where such rod is on one of the main panels 12, 14. Rods 46, 48 in the side panels 16, 18 also extend from a central section of the respective frame member to which such rod is anchored. Rods 156 extend from a central section in inner frame 152 of the pet door 148.

Slide connectors 22 (i.e., individual connectors 92, 94, 96, 98) can extend for 360 degrees or can stop short of 360 degrees. Connectors 22 can be tightened to prevent sliding of the panels 12, 14 relative to each other. Connectors 22 can be loosened to permit sliding of the panels 12, 14 relative to each other. Two top connectors 94, 98 fix the top horizontally extending members 26 of panels 12, 14 to each other. Two bottom connectors 92, 96 fix the bottom horizontally extending members 28 of panels 12, 14 to each other. Each of the connectors 92, 94, 96, 98 is affixed to either an inner end portion of upper horizontal member 26 or an inner end portion of lower horizontal member 28.

Bottom horizontally extending member 38 is integral and one-piece from end 132 to end 134 and from its lower edge to its upper edge.

Main panel 12 and main panel 14 can be slid relatively closely together such that side panels 16, 18 can fit inside of a relatively narrow opening such as a doorway opening. Main panel 12 and main panel 14 can be slid relatively far apart to partition a room in half. Each of barriers 10, 146 can wall off a corner of a room so as to form a triangular playpen for a pet or child. Each of barriers 10, 100 and 146 can be picked up as one piece and moved to another location in the house. Each of barriers 10 and 146 can be can be stored in a generally flat form by removing pin connectors 50 so as to disengaged side panels 16, 18 from their respective main panels 12, 14. Barrier 100, having only panels 12, 14, is operative in a flat form and can be stored in its operating flat form.

Grids 20, 21 and the grid in inner frame 152 of pet door 148 can be a mesh or network, or an arrangement of metal or plastic links or wires or rods or elongate elements that engage each other and have small openings, such as evenly spaced, uniform small openings.

FIG. 5a is a side view of an alternate embodiment of a side panel and leg of the present in-house stand alone residential barrier of FIG. 1, and shows a leg 158 spaced from, confronting, and engaging a side panel 160.

Side panel 160 is a panel utilized in the embodiments of FIGS. 5a, 5b, 6a, 6b, 6c, 7a, and 7c. Side panel 160 includes the top horizontal member 36, the outer side vertical frame member 40, and the inner side vertical frame member 42. In FIGS. 5a, 5b, 6a, 6b, 6c, 7a and 7c (and further in FIGS. 5c and 7d) side vertical frame members 40, 42 are shown to have a greater width (distance from vertical edge to vertical edge) than the side vertical frame members 40, 42 of panels 16 and 18 of FIGS. 1 and 4. The lesser width of FIGS. 1 and 4 is preferred. Further preferred in the side panels 16 and 18 of FIGS. 1 and 4 are the rounded corners between the upper edge and vertical side edges of top horizontal frame member 36. Side panel 160 of FIGS. 5a, 5b, 6a, 6b, 6c, 7a, and 7c further includes a lower or bottom horizontal frame member 162. Bottom horizontal frame member 162 is the same length as top horizontal member 36. Vertical members 40 and 42 are sandwiched between horizontal members 36 and 162. Bottom member 162 includes a pair of feet 24. Grid 21 is engaged in the side panel 160 by being engaged in the endless channel 34 running entirely about the inner periphery of the side panel 160. Bottom member 162 includes a portion of this channel 34 such that the channel is formed in a portion of the upper edge of bottom member 162 and such that the channel portion does not extend to the outer ends of bottom member 162.

The embodiments of FIGS. 5a, 5b, 5c, 6a, 6b, 6c, 7a, 7c, and 7d include respective legs 158, 166, 174, 182, 190, 158, 192, 196 and 200. These legs are formed of the same material as frame members 26, 28, 30, 32, 36, 38, 40, and 42 of barrier 10, such as a wood, a wood composite, or a synthetic wood material. These legs have the same thickness (distance from vertical face to vertical face) and same height (distance from horizontal edge to horizontal edge) as the top and bottom frame members 26, 28, 36 and 38 of barrier 10, except for a portion of leg 200 in FIG. 7d that includes a cutout. With respect to the embodiment of FIG. 7d, leg 200 includes the same thickness as frame members 26, 28, 30, 32, 36, 38, 40 and 42. Further, the noncutout portion of leg 200 includes the same height as frame members 26, 28, 30, 32, 36, 38, 40 and 42.

As shown in FIG. 5a, leg 158 is coupled to the bottom horizontal frame member 162 by one or more pin connectors 164. Leg 158 includes at least one foot 24 engaged to the lower edge of leg 158 proximate one of the ends of leg 158. Another foot 24 may be engaged to the lower edge of leg 158 at or proximate to the other end of leg 158.

Leg 158 is spaced from and confronts an end of bottom horizontal frame member 162. Leg 158 is aligned with bottom horizontal frame member 162 such that leg 158 and bottom horizontal frame member 162 together define a straight line. One or more pin connectors 164 may be utilized. A pair of pin connectors 164 are preferred to minimize the chance of rotation between leg 158 and bottom horizontal frame member 162, whether such rotation is rotation about a longitudinal axis of leg 158 and member 162 or some other rotation. Pin connector 162 may run from an outer face of leg 158 to an outer face of the bottom horizontal frame member 162. Pin connector 162 may run from an inner face of leg 158 to an inner face of the bottom horizontal frame member 162. A pair of pin connectors 162 may extend between such inner faces. A pair of pin connectors 162 may extend between such outer faces. Upper pin connectors 164 if used may be connected to each other at their ends through leg 158 and through horizontal member 162. Lower pin connectors 164 if used may be connected to each other at their ends through leg 158.

Figure 6A:
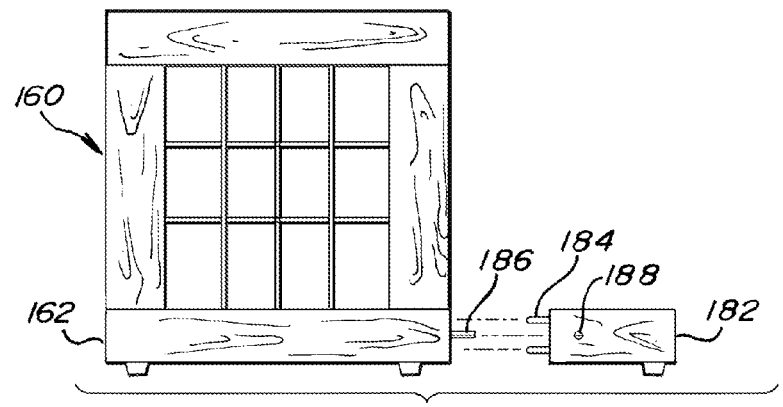
FIG. 6a is a side view of an alternate embodiment of a side panel and leg of the present in-house stand alone residential barrier of FIG. 1, and shows a leg engaging a side panel with a pair of wooden dowel pins and a metal pin connector.
Figure 6B:
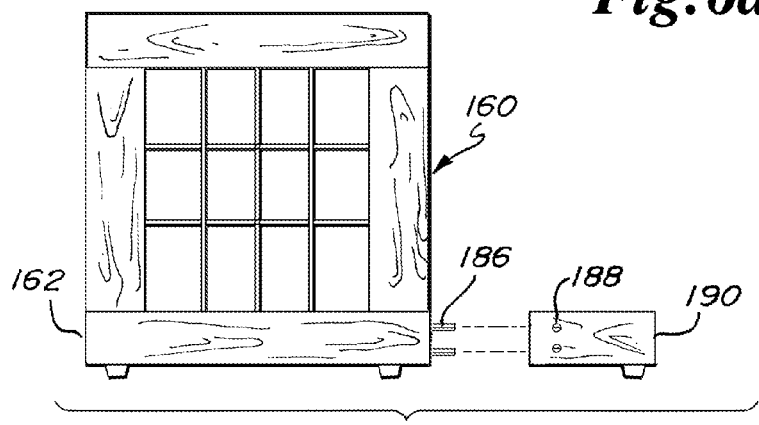
FIG. 6b is a side view of an alternate embodiment of a side panel and leg of the present in-house stand alone residential barrier of FIG. 1, and shows a leg engaging a side panel with a pair of metal pin connectors.
Figure 6C:
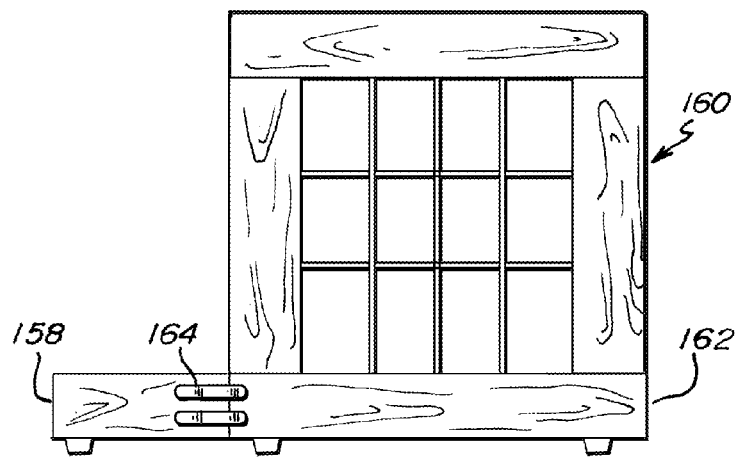
FIG. 6c is a side view of an alternate embodiment of a side panel and leg of the present in-house stand alone residential barrier of FIG. 1, and shows a leg engaging a side panel with a pair of couplers.

The embodiment of FIG. 6c is identical to the embodiment of FIG. 5a except that the inner end of leg 158 abuts and makes contact with an end of horizontal frame member 162. Further as to this butt joint of FIG. 6c, wooden dowel pins 184 and/or metal pin connections 186, 188 may be used if desired.

FIG. 5b is a perspective view of an alternate embodiment of a side panel and leg of the present in-house stand along residential barrier of FIG. 1, and shows a leg 166 fixed to the bottom horizontal frame member 162 of the side panel 160 and being in a plane confronting a plane of the side panel 160. Leg 166 is coupled to the bottom horizontal frame member 162 by one or more pin connectors 168. Leg 166 includes at least one foot 24 engaged to the lower edge of leg 166 proximate one of the ends of leg 166. Another foot 24 may be engaged to the lower edge of leg 166 at or proximate to the other end of leg 166. An inner vertically extending face of leg 166 confronts an outer vertically extending face of bottom horizontal frame member 162. Pin connectors 168 extend laterally through leg 166 and into bottom horizontal frame member 162. Leg 166 is greater in length than the bottom horizontal frame member 162. Leg 166 cuts through the first plane in which the first panel 12 resides and the second plane in which the second panel 14 resides. Bottom horizontally extending frame member 162 includes two ends. Leg 166 extends between these ends and further beyond one of such ends. One end of leg 166 is flush with one end of bottom horizontal frame member 162. Bottom horizontally extending frame member 162 is disposed in a plane that confronts a plane in which leg 166 lies. Bottom horizontally extending frame member 162 includes a pair of horizontally and laterally extending openings 170, such as through openings, for the removable pin connectors 168. Leg 166 includes a pair of horizontally extending openings 172, such as through openings, for the pin connectors 168.

FIG. 5c is a side view of an alternate embodiment of leg and side panel of the present in-house stand alone residential barrier of FIG. 1, and shows a leg 174 that is removably engaged to bottom ends 176 of vertical frame members 40, 42 of a side panel 178. Side panel 178 is identical to side panel 160 except that the bottom horizontal member 162 is removed. Side panel 178 includes top horizontal frame member 36 and side vertical members 40, 42 depending from the top horizontal frame member 36. Side panel 178 further includes grid 21 set in endless channel 34. Grid 21 is further set in a channel portion formed in the upper edge of leg 174 where such channel portion extends for the length of the grid 21. Leg 174 is coupled to the bottom ends of side vertical members 40, 42 by one or more vertically extending removable pin connectors 180 engaging vertically extending openings in leg 174 and side vertical members 40, 42. Leg 174 includes at least one foot 24 engaged to the lower edge of leg 174 proximate one of the ends of leg 174. Another foot 24 may be engaged to the lower edge of leg 174 at or proximate to the other end of leg 174. Leg 174 and side panel 178 are disposed in a common plane. Leg 174 is greater in length than top horizontally extending frame member 36. Leg 174 may be the same length as leg 166. One end of leg 174 is flush with a side edge of side vertical member 40. The other end of leg 174 extends beyond the side edge of side vertical member 42. Leg 174 cuts through each of the first and second planes in which the first and second panels 12 and 14 reside.

The embodiment of FIG. 6a includes side panel 160 and a leg 182. A connection between leg 182 and bottom horizontal frame member 162 includes two wooden dowel pins 184, a metal pin 186, and a pin receiver or cam or screw lock 188. As to metal pin 186 and pin receiver or cam or screw lock 188, the following U.S. patents are hereby incorporated by reference in their entireties: 1) the Giovannetti U.S. Pat. No. 4,202,645 issued May 13, 1980 and entitled Readily Releasable Clamping Connector, 2) the Martincic et al. U.S. Pat. No. 4,728,215 issued Mar. 1, 1988 and entitled Corner Connection For Furniture, 3) the Kriz U.S. Pat. No. 4,923,321 issued May 8, 1990 and entitled Furniture Connector, 4) the Kuzyk U.S. Pat. No. 4,886,326 issued Dec. 12, 1989 and entitled Interlock System For Ready To Assemble Furniture, And Furniture Incorporating Such System, 5) the Lechman U.S. Pat. No. 4,869,564 issued Sep. 26, 1989 and entitled Modular Furniture, and 6) the Novikoff U.S. Pat. No. 5,536,078 issued Jul. 16, 1996 and entitled Modular Furniture System. Dowel pins 184 are fixed to leg 182 and extend longitudinally from the inner end of leg 182. Dowel pins 184 are received in holes formed longitudinally in an end of bottom horizontally extending frame member 162 and glued therein. One of the dowel pins 184 is disposed above metal pin 186. One of the dowel pins 184 is disposed below metal pin 186. Metal pin 186 is fixed to bottom horizontal member 162 and extends longitudinally from the end of the member 162. Metal pin 186 is received in an opening formed longitudinally in leg 182 and extending from an end of leg 182 to pin receiver 188. Pin receiver 188 is set laterally in leg 182 and traverses the hole that receives metal pin 186. Pin receiver 188 is rotatable and engages the distal end of the shaft of metal pin 186. When rotated, pin receiver 188 is locked to or unlocked from the distal end of the shaft of the metal pin 186. When rotated, pin receiver 188 can draw the shaft of the metal pin 186 inwardly so as to draw the end of the leg 182 tightly against the end of the bottom horizontal frame member 162.

The embodiment of FIG. 6b is identical to the embodiment of FIG. 6a, except that the connection between bottom horizontal member 162 and leg 190 includes two metal pin connectors 186 and two pin receivers 188. Pin connectors 186 are set one above the other in a vertical plane with each other or offset and in different vertical planes. Pin connectors 186 extend from bottom horizontal frame member 162. If desired, pin connectors 186 can extend from the inner end of leg 190 and pin receivers 188 can be engaged in bottom horizontal member 162. Leg 182 and panel 160 are in a common plane.

The embodiment of FIG. 6c has been described above with respect to the embodiment of FIG. 5a. The embodiments of FIGS. 5a and 6c are identical except that the inner end of leg 158 in the embodiment of FIG. 6c abuts and makes contact with an end of horizontal frame member 162.

The embodiment of FIG. 7a is identical to the embodiment of FIG. 6c, except that the connection between the bottom horizontal member 162 and a leg 192 includes a stamped metal plate 194 instead of couplers 164. Stamped metal plate 194 includes a right angle bend such that the plate 194 can engage both a side and a bottom of leg 192 and both a side and a bottom of bottom horizontal frame member 162. Stamped metal plate 194 includes openings through which pin connectors, such as pin connectors 168 or 180, can be engaged. Pin connectors 168 or 180 can engage a metal plate 194 set on one side of leg 192 and bottom member 162, then extend through and engage leg 192 and bottom member 162, and then further extend through and engage a second metal stamped plate 194 set on the other side of the leg 192 and bottom member 162. If desired, stamped metal plate 194 can include a roughened inner surface, such as a surface with teeth punched-formed therein that dig into and beyond the surfaces of the leg 192 and bottom horizontal frame member 162. Preferably, when the leg 192 is connected to the frame member 162, the end of the leg 192 abuts and makes contact with the end of the bottom horizontal frame member 162.

The embodiment of FIG. 7c is identical to the embodiment of FIG. 6a, except that the connection between the side panel 160 and a leg 196 includes a pair of wooden dowel pins 184 instead of a combination of two wooden dowel pins 184 and one metal pin 186 and its associated pin receiver 188. Pins 184 are fixed to leg 196 and extend longitudinally relative to leg 196. Pins 184 are fixed in holes formed longitudinally in bottom horizontal frame member 162. Pins 184 may be set in a common vertical plane or may be offset from each other such that each pin 184 resides in a different vertical plane.

The embodiment of FIG. 7c includes a side panel 198 and a leg 200. Side panel 198 includes top horizontal frame member 36 and side vertical frame members 40, 42 depending from top horizontal frame member 36. Bottom ends of frame members 40, 42 are in turn set upon a bottom horizontal frame member 202. The height (or distance between upper and lower horizontal edges) of frame member 202 is one-half the height of other bottom horizontal frame members, such as horizontal frame member 162 and one-half the height of top horizontal frame member 36. Leg 200 includes a cutout 204. Bottom horizontal frame member 202 is set in cutout 204 such that the outer end of member 202 is flush with an end of leg 200, such that the other end of member 202 abuts and makes contact with the vertical edge of the cutout 204, such that the bottom edge of member 202 is set upon the horizontal edge of the cutout 204, and such that an upper edge of member 202 is flush with the uppermost edge of leg 200. Leg 200 is in a common plane with side panel 198. Leg 200 is engaged to bottom horizontal member 202 with pin connectors 206.

In the embodiments of FIGS. 5a, 5c, 6a, 6b, 6c, 7a, 7c and 7d, the respective legs 158, 174, 182, 190, 158, 192, 196 and 200 are in a common plane with side panel 160, side panel 178, or side panel 198. In the embodiment of FIG. 5b, leg 166 is out of the plane of side panel 160 and in a different plane that is parallel to and confronts the plane in which the side panel 160 resides.

In the embodiments of FIGS. 6a, 6b, 6c, 7a, and 7c, an end of bottom horizontal frame member 162 abuts and makes contact with an end of a leg, with such respective legs being legs 182, 190, 158, 192, and 196. In the embodiment of FIG. 7d, an end of bottom horizontal frame member 202 abuts and makes contact with a vertical edge or face of cutout 204. In the embodiment of FIG. 5a, the inner end of leg 158 is spaced from and confronting an end of bottom horizontal member 162.

Barrier 10 includes third and fourth panels 16 and 18. Any of the embodiments of FIGS. 5a, 5b, 5c, 6a, 6b, 6c, 7a, 7c, and 7d may be substituted for the panels 16 and 18 and their respective legs 118.

In the embodiments of FIGS. 5b, 5c, and 7d, each of the respective legs 166, 174 and 200 cuts through the first plane in which the first panel 12 resides and further cuts through the second plane in which the second panel 14 resides.

In the embodiments of FIGS. 5b, 5c, and 7d, each of the respective legs 166, 174 and 200 includes an end that is flush with an end of its respective side panel 160, 178, 198.

In the embodiments of FIGS. 5b and 7d, each of the bottom horizontally extending frame members 162, 202 includes two ends. Each of the respective legs 166 and 200 extends between such two ends of members 162 and 202 and further extends beyond one of such ends.

FIGS. 3A, 3B, 3C, 3D and 3E show a locking mechanism 22 for permitting first and second objects 12, 14 to slide by each other and for fixing the first and second objects 12, 14 together in a nonsliding fashion. The locking mechanism 22 includes base 52. The base 52 is fixed to the first object 12. The base 52 includes lip 57 that confronts the second object 14. The locking mechanism 22 further includes the swinging element 60. Swinging element 60 includes first and second ends 62, 66. The first end 62 is pivotally connected to the base 52 on a first axis. The second end 66 includes roller 68 on a second axis. The first and second axes are parallel to each other. The swinging element 60 is swingable away from the base 62 to an unlocked position in which the first and second objects 12, 14 can slide by each other. The swinging element 60 is swingable toward the base 52 to a locked position in which the roller 68 engages the second object 14 such that the roller 68 pinches the second object 14 to the base 52 that is fixed to the first object 12 such that the first and second objects 12, 14 are fixed together in a nonsliding fashion. The first end 62 is bifurcated and receives lip 57. The second end 66 is bifurcated and receives roller 68. Base 52 is C-shaped. Swinging element 60 is C-shaped. Base 52 includes another lip 54 and traversing section 56. One of the lips 54, 57 confront the first object 12 and the other of the lips 54, 57 confront the second object 14, and the traversing section 56 confronts each of the first and second objects 12, 14. One of the lips 54, 57 is at a right angle to the traversing section 56. Each of the lips 54, 57 is at a right angle to the traversing section 56. The swinging element 60 includes body 78 between the first and second ends 62, 66. Body 78 is resilient such that the swinging element 60 can flex. Body 78 is unflexed in the unlocked position where the first and second objects 12, 14 can slide by each other. Body 78 is flexed in the locked position to pinch the second object 14 to the base 52. Body 78 is one-piece and integral with the first and second ends 62, 66 of swinging element 60. The second end 66 of the swinging element 60 includes an axis. The axis has a first position C when the swinging element 60 is in the locked position and a second position A when the swinging element 60 is in the unlocked position. The roller 68 includes a cylindrical outer surface 74. In the locked position the second object 14 is engaged by each of the base 52 and cylindrical outer surface 74 of the roller 68. In the locked position the second object 14 is engaged by each of the base 52 and roller 68. Locking mechanism 22 includes base 52 having first lip 54, second lip 57, and traversing section 56 between the first and second lips 54, 57 such that the base 52 is C-shaped. Base 52 is fixed to the first object 12. First lip 54 confronts the first object 12, the second lip 57 confronts the second object 14, and the traversing section 56 confronts each of the first and second objects 12, 14. Locking mechanism 22 further includes swinging element 60. Swinging element 60 includes first and second ends 62, 66. Swinging element 60 is C-shaped. First end 62 is pivotally connected to the base 52. Second end 66 engages the second object 14. Swinging element 60 is swingable away from the base 52 to an unlocked position in which the first and second objects 12, 14 can slide by each other. Swinging element 60 is swingable toward the base 52 to a locked position in which the second end 66 engages the second object 14 such that the second end 66 pinches the second object 14 to the base 52 that is fixed to the first object 12 such that the first and second objects 12, 14 are fixed together in a nonsliding fashion. Swinging element 60 includes body 78 between the first and second ends 62, 66. Body 78 is resilient such that the swinging element 60 can flex when the swinging element 60 is in the locked position to pinch the second object 14 to the base 52. Second end 66 includes roller 68. Roller 68 engages the second object 14 in the locked position. First end 62 is pivotally connected to the base 52 on a first axis, roller 68 rolls on a second axis, and the first and second axes are parallel to each other.

A part or parts from one embodiment may be added to another embodiment. A part or parts from one embodiment may be replaced with a part or parts of another embodiment. In other words, a bed rail or guard frame according to the invention may feature a first part from a first embodiment, a second part from a second embodiment, a third part from a third embodiment, a fourth part from a fourth embodiment, and so on. Features may be interchanged between one or more embodiments.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A locking mechanism for permitting first and second objects to slide by each other and for fixing the first and second objects together in a nonsliding fashion, the locking mechanism comprising:
   a) a base, the base being fixed to the first object, the base including a lip that confronts the second object; and
   b) a swinging element, the swinging element having first and second ends, the first end being pivotally connected to the base on a first axis, the second end having a roller on a second axis, the first and second axes being parallel to each other, the swinging element being swingable away from the base to an unlocked position in which the first and second objects can slide by each other, the swinging element being swingable toward the base to a locked position in which the roller engages the second object such that the roller pinches the second object to the base that is fixed to the first object such that the first and second objects are fixed together in a nonsliding fashion.

2. The locking mechanism of claim 1, wherein the first end is bifurcated and receives said lip.

3. The locking mechanism of claim 1, wherein the second end is bifurcated and receives said roller.

4. The locking mechanism of claim 1, wherein the base is C-shaped.

5. The locking mechanism of claim 1, wherein the swinging element is C-shaped.

6. The locking mechanism of claim 1, wherein the base further includes another lip and a traversing section, one of the lips confronting the first object and the other of the lips confronting the second object, and the traversing section confronting each of the first and second objects.

7. The locking mechanism of claim 6, wherein one of the lips is at a right angle to said traversing section.

8. The locking mechanism of claim 6, wherein each of the lips is at a right angle to said traversing section.

9. The locking mechanism of claim 1, wherein said swinging element includes a body between said first and second ends, the body being resilient such that said swinging element can flex.

10. The locking mechanism of claim 9, wherein said body is unflexed in said unlocked position where the first and second objects can slide by each other.

11. The locking mechanism of claim 9, wherein said body is flexed in said locked position to pinch the second object to the base.

12. The locking mechanism of claim 9, wherein said body is one-piece and integral with the first and second ends of said swinging element.

13. The locking mechanism of claim 1, wherein said second end of said swinging element includes an axis, the axis having a first position when the swinging element is in the locked position, the axis having a second position when the swinging element is in the unlocked position.

14. The locking mechanism of claim 1, wherein said roller includes a cylindrical outer surface.

15. The locking mechanism of claim 14, wherein in the locked position the second object is engaged by each of said base and cylindrical outer surface of said roller.

16. The locking mechanism of claim 1, wherein in the locked position the second object is engaged by each of said base and roller.

17. A locking mechanism for permitting first and second objects to slide by each other and for fixing the first and second objects together in a nonsliding fashion, the locking mechanism comprising:
   a) a base having a first lip, a second lip, and a traversing section between the first and second lips such that the base is C-shaped, the base being fixed to the first object, the first lip confronting the first object, the second lip confronting the second object, and the traversing section confronting each of the first and second objects;
   b) a swinging element, the swinging element having first and second ends, the swinging element being C-shaped, the first end being pivotally connected to the base, the second end engaging the second object, the swinging element being swingable away from the base to an unlocked position in which the first and second objects can slide by each other, the swinging element being swingable toward the base to a locked position in which the second end engages the second object such that the second end pinches the second object to the base that is fixed to the first object such that the first and second objects are fixed together in a nonsliding fashion; and c) the swinging element including a body between said first and second ends, the body being resilient such that said swinging element can flex when the swinging element is in the locked position to pinch the second object to the base.

18. The locking mechanism of claim 17, wherein the second end includes a roller, the roller engaging the second object in the locked position.

19. The locking mechanism of claim 18, wherein the first end is pivotally connected to the base on a first axis, wherein the roller rolls on a second axis, and wherein the first and second axes are parallel to each other.

* * * * *